3,431,080
APPARATUS FOR THE PRODUCTION OF HEAVY WATER
Michel Rostaing, Orsay, France, assignor to Commissariat à l'Energie Atomique, a French establishment
Filed Nov. 13, 1964, Ser. No. 410,951
Claims priority, application France, Nov. 15, 1963, 953,836
U.S. Cl. 23—270.5      1 Claim
Int. Cl. B01d 59/22

ABSTRACT OF THE DISCLOSURE

Heavy water is produced by the countercurrent isotope exchange process in two exchange zones at different temperatures between a current of liquid water which is the deuterium source and a current of the $H_2S$ gas which is the exchange medium. High pressure superheated steam from a boiler drives a steam turbine which is operatively connected to drive the blower for circulating the $H_2S$ gas and to drive an electrical alternator. Expanded steam leaving the turbine passes in parallel flow through a pair of heat exchangers and is then returned to the boiler for reheating.

---

This invention relates to an improved apparatus for the production of heavy water by the countercurrent isotope exchange process in two exchange zones at different temperatures, between a current of liquid water which is the deuterium source and a current of $H_2S$ gas which is the exchange medium. These two substances contain hydrogen and can undergo a reversible isotope exchange reaction; the effect of such a reaction is to enrich the aqueous phase in deuterium in the lower-temperature exchange zone and enrich the gaseous phase in deuterium in the higher-temperature exchange zone.

Figure 1:
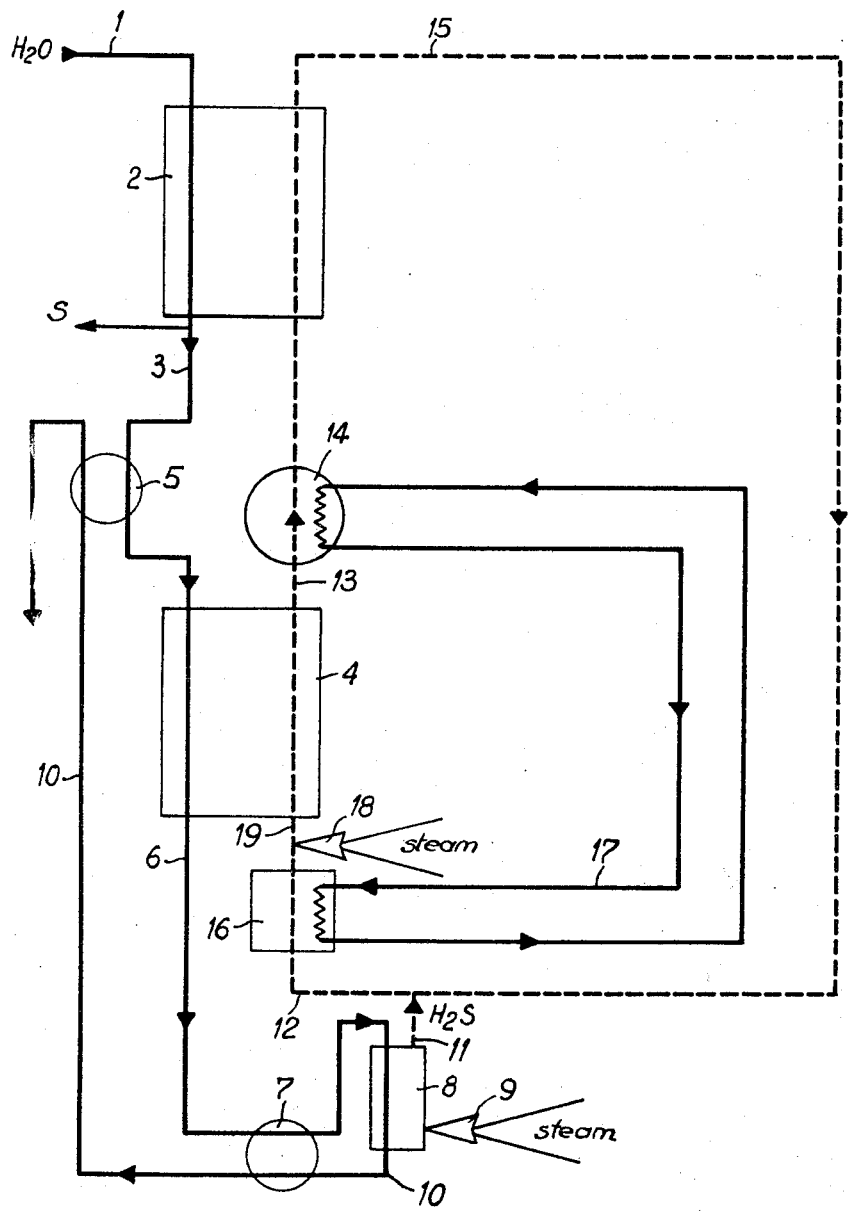

In a conventional form of apparatus using the isotope exchange process, as illustrated diagrammatically in FIG. 1 of the accompanying drawing, water is supplied via pipe 1 to a cold tower 2 in countercurrent with an ascending stream of deuterium-rich $H_2S$ gas. The water becomes enriched in deuterium at the expense of the $H_2S$ gas and leaves the cold tower via the pipe 3 and flows to a hot tower 4 via a first heat exchanger 5 which raises its temperature to the reaction temperature in the hot tower in which the deuterium-rich water flows in countercurrent with an ascending stream of $H_2S$ gas and becomes impoverished in deuterium to the benefit of the $H_2S$ gas. The extracted water then leaves the hot tower via pipe 6 and a second heat exchanger 7 and flows to a degasification tower 8 into which live steam is directly injected via 9 to desorb the $H_2S$ dissolved in the extracted water. The latter is then discharged from the degasification tower via the pipe 10 and the two heat exchangers 7 and 5 aforesaid in which it yields up its heat.

The $H_2S$ gas desorbed in the degasification tower is fed via pipes 11 and 12 and a humidification tower 16 to the hot tower in which it becomes enriched in deuterium at the expense of the deuterium-rich water introduced into the same tower as already described hereinbefore. It then flows via conduit 13 to the cold tower 2 via a third heat exchanger 14 in which it gives up heat and is brought to the reaction temperature in the cold tower 2. In the latter the deuterium-rich $H_2S$ gas becomes impoverished in deuterium to the benefit of the water introduced into the same tower, as already described hereinbefore. The extracted $H_2S$ gas is recycled via the conduits 15 and 12 to the hot tower via a humidification tower 16 fed by a water circuit 17 flowing in a closed cycle via the third heat exchanger 14. Live steam is injected at 18 directly into the pipe 19 carrying the humidified $H_2S$ before the latter enters the hot tower to complete the saturation of the gas and bring it to the reaction temperature in the hot tower.

The heavy water accumulates at the base of the cold tower, where it can be continuously withdrawn from the liquid circuit at S.

In the conventional apparatus the direct injection of live steam at 18 to complete the saturation of the $H_2S$ gas is a serious disadvantage because it results in deuterium being supplied at a place where the content of that isotope must be minimum to ensure good extraction of the main flow of liquid water.

The present invention therefore relates to an improved apparatus for the production of heavy water by the isotope exchange process, whereby the said injection of live steam is obviated and the steam can be used more rationally to satisfy power, mechanical, electrical and thermal requirements than in the conventional apparatus.

To this end, according to a first feature of the invention, the apparatus according to the invention comprises a boiler for the generation of high-pressure superheated steam; a steam turbine through which the boiler-generated steam is expanded, such turbine being used to drive the mechanical devices of the apparatus, such as $H_2S$ gas circulating blowers and an alternator to meet the other requirements of the apparatus; and a circuit for the steam circulation after expansion through the turbine, this circuit feeding heat exchangers associated firstly with the humidification loop to complete saturation of the $H_2S$ gas flowing from the cold tower to the hot tower, and secondly the circuit for the extracted water which is to be expanded in the degasification tower.

According to another feature of the invention, the extracted water leaving the hot tower is re-heated and then expanded through an expansion valve and fed to the degasification tower for desorption of the residual $H_2S$.

Figure 2:
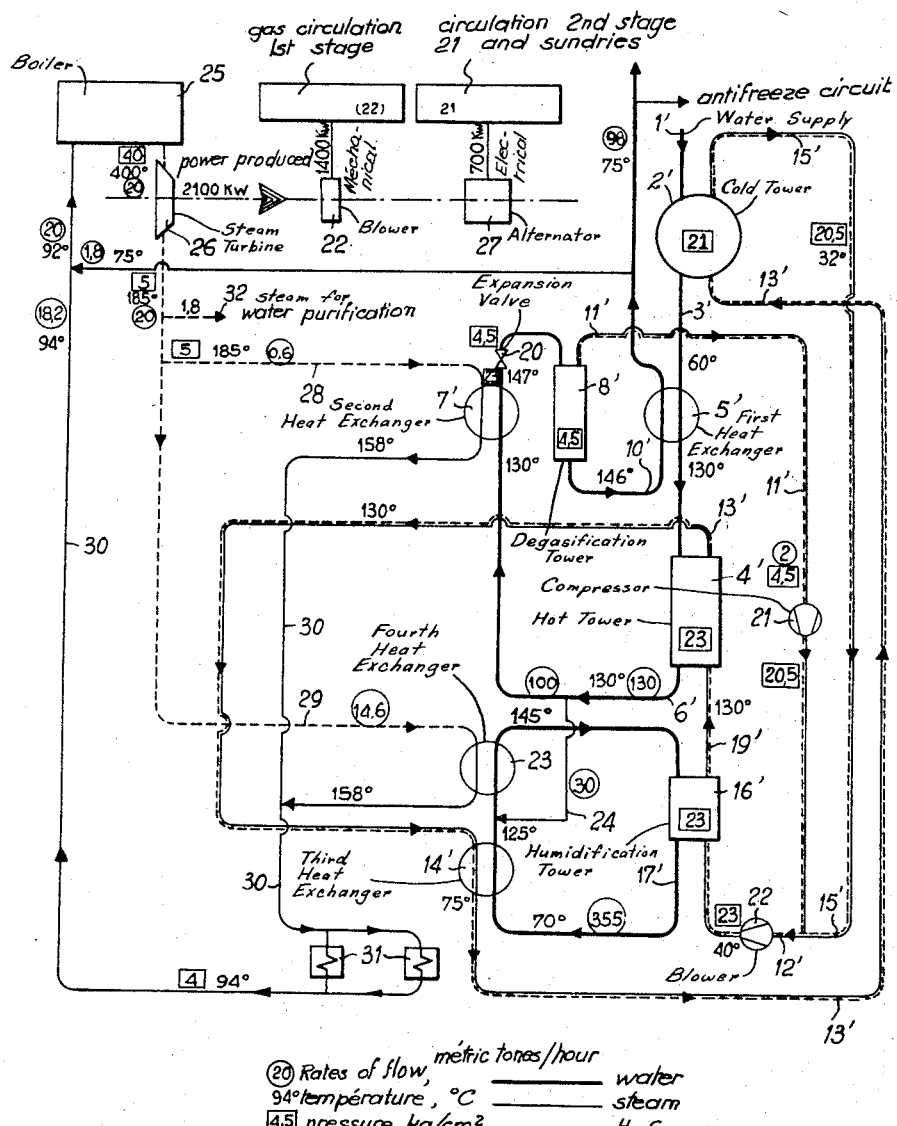

The improved apparatus according to the invention is shown in FIG. 2 of the accompanying drawing and comprises essentially a cold tower 2', a hot tower 4', a degasification tower 8' and a humidification tower 16'.

The water circuit comprises a pipe 1' for supplying water to the top of the cold tower, a pipe 3' connecting the bottom of the cold tower to the top of the hot tower via a first heat exchanger 5', a pipe 6' connecting the bottom of the hot tower to the top of the degasification tower 8' via a second heat exchanger 7', an expansion valve 20 being provided in the pipe 6' between the second heat exchanger 7' and the degasification tower 8', and a discharge conduit 10' connected to the bottom of the degasification tower for discharging water from the latter via the first heat exchanger 5'.

The $H_2S$ gas circuit comprises firstly pipes 11', 12' connecting the top of the degasification tower 8' to the bottom of the humidification tower 16', the pipe 11' containing a compressor 21 and the pipe 12' containing a blower 22 for circulation of $H_2S$ gas, and secondly, a pipe 19' connecting the top of the humidification tower 16' to the bottom of the hot tower 4', another pipe 13' connecting the top of the hot tower 4' to the bottom of the cold tower 2' via a third heat exchanger 14' and finally, a pipe 15' connecting the top of the cold tower 2' to the pipe 12' which leads to the humidification tower 16'.

Associated with the latter is a water circuit 17', the water flowing in a closed cycle via the third heat exchanger 14' and a fourth heat exchanger 23. Said circuit 17' is also supplied with water from pipe 6' via a branch pipe 24, the supply being in a suitable proportion to make up the amount of water vaporised in the exchanger 16 to saturate the $H_2S$ gas.

The apparatus also comprises a steam circuit comprising a boiler 25 for the generation of high-pressure superheated steam, a steam turbine 26 receiving the boiler steam and driving the blower 22 and an alternator 27, heater pipes 28, 29 conveying steam, after expansion through the turbine 26, to the heat exchangers 7' and 23 respectively.

At the output of the heat exchangers 7' and 23 these heater pipes 28 and 29 are connected to the boiler 25 through a return pipe 30 via the end tubes 31.

During operation, the feed water arriving at the top of the cold tower 2' via the pipe 1' flows down in the tower, in which there is a pressure of 21 kg. per sq. cm., in countercurrent with the ascending stream of $H_2S$ gas supplied via pipe 13', and becomes enriched in deuterium at the expense of that gas; this deuterium-enriched water is discharged at the bottom of the cold tower via pipe 3' and arrives at the top of the hot tower 4' via the first heat exchanger 5' which brings its temperature to 130°; in the hot tower, in which there is a pressure of 23 kg. per sq. cm., the enriched water flows in countercurrent with the $H_2S$ gas at 130° C. supplied via pipe 19' and becomes impoverished in deuterium to the benefit of the $H_2S$ gas; this extracted water is then discharged at the bottom of the hot tower and is fed partly via the branch pipe 24 to the humidification loop 17' and partly via pipe 6' and the second heat exchanger 7', which raises its temperature to 147° C., through the expansion valve 20 which reduces its pressure from 23 kg. per sq. cm. to 4.5 kg. per sq. cm., and then to the degasification tower 8' in which the pressure is 4.5 kg. per sq. cm., for desorption of the $H_2S$ dissolved in the extracted water. The latter is discharged at 146° C. at the bottom of the degasification tower through the discharge pipe 10' and the heat exchanger 5', in which it gives up its heat and is brought to a temperature of 75° C.

The $H_2S$ gas liberated in the degasification tower 8' is fed via pipe 11', compressor 21, conduit 12', blower 22, at 40° C. and a pressure of 23 kg. per sq. cm., to the humidification tower 16' fed by the humidification loop 17' in which the water leaving the humidification tower at 70° C. is reheated to 125° C. by the heat exchanger 14' and then to 145° C. by the heat exchanger 23, and is returned to the humidification tower 16'. The humidified gas at 130° C. leaves the tower 16' via conduit 19' to the bottom of the hot tower 4' which it ascends in countercurrent with the water supplied via pipe 3', and becomes enriched in deuterium at the expense of the water. The enriched gas leaves tower 4' at 130° C. via pipe 13' and flows via heat exchanger 14', which reduces its temperature to 75° C., and arrives at the bottom of the cold tower 2', which it ascends in countercurrent with the water supplied via pipe 1' and becomes impoverished in deuterium to the benefit of this water. The impoverished gas then leaves the cold tower via the pipe 15' and is recycled to the pipe 12'.

The power requirements of an apparatus of the kind hereinbefore described for the production of 25 metric tons of heavy water per year, for example, and comprising a primary two-stage $H_2S$ enriching operation and a final water distillation operation are approximately as follows:

(1) 7,500 thermies* per hour to complete the saturation at 130° C. of the gas flowing from the cold tower to the hot tower and already preheated by recovery of the heat of the gas leaving the hot tower.

(2) 1,700 thermies* per hour to raise to boiling the extracted water leaving the hot tower at 130° C. in order to recover the dissolved $H_2S$ it contains.

(3) 1,000 thermies* per hour for the water distillation end tubes.

---
* One thermie is the quantity of heat required to raise by 1° C. the temperature of a 1 metric ton mass of a body having a specific heat equal to that of water at 15° C. and the normal atmospheric pressure of 1.013 hectopieze, and is equal to 1000 Kcals.

(4) A certain amount of water for the anti-freeze circuit to ensure that the pipes and valves are kept at a temperature above 30° C., which is the hydrate formation point. It will be apparent that the extracted water is at a final temperature of 75° C. in a quantity apparently sufficient to ensure this: about 100 cubic metres per hour.

(5) 1.8 metric tons per hour of low-pressure steam for the process water purification requirements.

(6) 2,100 kw. representing the power absorbed by the apparatus, as follows:

1,400 kw. for the first-stage gas blower
700 kw. for the second-stage blower, the degasified $H_2S$ compressor, pumps and all other requirements of the apparatus.

These requirements are satisfied by the production of steam at 40 kg. per sq. cm. superheated to 400° C. in the boiler 25:

(a) By expansion of this steam to 5 kg. per sq. cm. through the steam turbine 26, the latter directly drives the first-stage blower 22 and the alternator 27 which produces 700 kw. and covers all the other requirements.

(b) Condensation of the steam at 5 kg. per sq. cm. provides the 7,500 thermies requires for the complete saturation of the process gas by means of the humidification loop 17' by the heat exchanger 23 and the extracted water is reheated to 147° by the exchanger 7', said water being expanded at 4.5 kg. per sq. cm. in the degasification tower 8' and desorbing the $H_2S$ (the latter being taken up by a compressor 21 and re-injected upstream of the blower 22; the power of this compressor, approximately 80 kw., is included in the 700 kw. produced by the alternator 27).

(c) The condensates of the steam in the heat exchangers 7' and 23 are fed to the end evaporators 31 and give up about 1,000 thermies per hour required and are then returned to the boiler 25.

(d) The low-pressure steam required for water purification (1.8 metric tons per hour) is taken from the output of the turbine (5 kg. per sq. cm.) through the pipe 32.

Finally, all the power requirements are satisfied by the production of 20 metric tons per hour of steam at 40 kg. per sq. cm. superheated to 400° and produced from water at 92° C.

What I claim is:

1. In apparatus for the production of heavy water by the countercurrent isotope exchange process in two exchange zones at different temperatures, between a current of liquid water which is the deuterium source and a current of $H_2S$ gas which is the exchange medium, the combination of a cold tower, a hot tower, a degasification tower, a humidification tower, water supply means connected to the top of the cold tower, a first water pipe connecting the bottom of the cold tower to the top of the hot tower, a first heat exchanger in said first pipe, a second water pipe connecting the bottom of the hot tower with the top of the degasification tower, a second indirect contact heat exchanger in said second pipe, an expansion valve in said second pipe between said second heat exchanger and said degasification tower, a water discharge conduit connected to the bottom of the degasification tower and passing through said first heat exchanger, a third gas pipe connecting the top of the degasification tower with the bottom of the humidification tower, a compressor and a blower connected in series in said third pipe line, a fourth gas pipe connecting the top of said humidification tower and the bottom of the hot tower, a fifth gas pipe connecting the top of the hot tower to the bottom of the cold tower, a third heat exchanger in said fifth pipe, a sixth gas pipe connecting the top of the cold tower to said third pipe line between said compressor and blower, a seventh water pipe connecting the bottom and the top of said humidifier, said seventh pipe passing in series heat exchange through said third heat exchanger and a fourth indirect contact heat exchanger, an eighth water pipe connecting said second pipe at a point between said hot tower and said second heat exchanger with said seventh pipe at a point between said third and fourth heat exchangers, a boiler for the production of high pressure superheated steam, a steam turbine through which the boiler-generated steam is expanded, said turbine, being operatively connected to drive said blower, and a circuit for passing the steam, after expansion through said turbine, in parallel flow indirect heat exchange through said fourth and second heat exchangers, and returning the steam to the boiler for reheating.

References Cited

UNITED STATES PATENTS

| | | | |
|---|---|---|---|
| 2,741,543 | 4/1956 | Urey | 23—204 |
| 2,895,803 | 7/1959 | Spevack | 23—204 |
| 3,028,222 | 4/1962 | Eriksson | 23—204 |
| 3,142,540 | 7/1964 | Spevack | 23—204 X |
| 3,214,243 | 10/1965 | Lazard | 23—204 X |

OTHER REFERENCES

Bebbington et al.: "Production of Heavy Water," Chemical Engineering Progress, vol. 55, #9, September 1959, pp. 70 thru 78.

WILBUR L. BASCOMB, JR., *Primary Examiner.*

S. J. EMERY, *Assistant Examiner.*

U.S. Cl. X.R.

23—204, 312